United States Patent [19]
Arques

[11] Patent Number: 4,945,243
[45] Date of Patent: Jul. 31, 1990

[54] MATRIX OF PHOTOSENSITIVE ELEMENTS AND RADIATION DETECTOR INCLUDING SUCH A MATRIX, ESPECIALLY DOUBLE-ENERGY X-RAY DETECTOR

[75] Inventor: Marc Arques, Grenoble, France

[73] Assignee: Thomson-CSF, Paris, France

[21] Appl. No.: 314,429

[22] Filed: Feb. 22, 1989

[30] Foreign Application Priority Data

Feb. 26, 1988 [FR] France ................ 88 02361

[51] Int. Cl.$^5$ ................ G01T 1/20; H01L 31/10
[52] U.S. Cl. ................ 250/367; 250/370.11; 250/578.1
[58] Field of Search ............ 250/367, 370.08, 370.09, 250/370.11, 578; 357/32, 30; 358/213.11

[56] References Cited

U.S. PATENT DOCUMENTS

| | | | |
|---|---|---|---|
| 3,551,761 | 12/1970 | Ruoff ................ | 357/32 |
| 3,660,667 | 5/1972 | Weimer ................ | 250/209 |
| 3,753,247 | 8/1973 | Rajchman ................ | 357/32 |
| 4,581,625 | 4/1986 | Gay et al. . | |
| 4,660,095 | 4/1987 | Cannella et al. ........... | 358/213.11 |
| 4,672,454 | 6/1987 | Cannella et al. ........... | 250/370.11 |
| 4,675,739 | 6/1987 | Catchpole et al. .......... | 358/213.11 |
| 4,691,243 | 9/1987 | Cannella et al. ........... | 358/213.11 |
| 4,691,244 | 9/1987 | Cannella et al. ........... | 358/213.11 |

FOREIGN PATENT DOCUMENTS

0163956 12/1985 European Pat. Off. .
0223545 5/1987 European Pat. Off. .

Primary Examiner—Janice A. Howell
Assistant Examiner—Richard Hanig
Attorney, Agent, or Firm—Roland Plottel

[57] ABSTRACT

The invention relates to the processing of images, especially radiological images, by means of a photosensitive matrix (1) permitting the simultaneous acquisition of a plurality of images. The matrix (1) of the invention includes an array of line conductors (L1 to L3) and an array of column conductors (F1 to F3). Photosensitive points (P1 to P9) are formed at each crossing of a line conductor (L1 to L3) with a column conductor (F1 to F3); each photosensitive point having one end (10) connected to the line conductor and the other end (11) connected to the column conductor. According to a feature of the invention, each photosensitive point (P1 to P9) consists of two photosensitive elements (DA, DB) and a capacitor (CI) all connected in series, the two photosensitive elements (DA, DB) having opposite directions of conduction. Consequently, each photosensitive point (P1 to P9) may include two zones (A, B) of floating potential permitting the creation and the storage of two quantities of charge, one of which is proportional to the illumination of one of the photosensitive elements (DA, DB) and the other of which is proportional to the illumination of the other element.

24 Claims, 3 Drawing Sheets

FIG_1

MATRIX OF PHOTOSENSITIVE ELEMENTS AND RADIATION DETECTOR INCLUDING SUCH A MATRIX, ESPECIALLY DOUBLE-ENERGY X-RAY DETECTOR

FIELD OF THE INVENTION

The invention relates to the processing of images by means of matrices of photosensitive elements, and relates more particularly to a matrix arrangement of photosensitive elements permitting the simultaneous acquisition of a plurality of images. The invention also relates to a radiation detector utilizing such an arrangement of photosensitive elements, especially an X-ray detector permitting the simultaneous processing of two images each corresponding to a different energy spectrum of the X-rays.

DESCRIPTION OF THE PRIOR ART

Taking, for example, the field of radiology and of radiodiagnostics, it is beneficial to produce, in the course of the examination of a patient, two plates each corresponding to a different energy of the X-rays, in such a manner as to obtain specific information relating to certain substances, by differentiation of the plates.

The images of this type, or two-energy images, constructed currently by radiologists, are obtained from two images of a same zone of the patient which are formed in succession, either by modifying from one image to the other the conditions of the X-rays (different energy spectrum of the X-rays), or by utilizing sensors sensitive to different energy windows of the X-rays, this being obtained, for example, by changing the type of scintillator employed to convert the X-rays into a visible light to which a photographic film is exposed (the scintillator is a substance which has the property of being excited by X-rays and of emitting, in response to this excitation, a radiation of wavelength which is visible or near visible; the scintillator has a maximum conversion yield, or maximum sensitivity, within a certain energy range of the X-rays, this energy range being determined by the nature of the substance which constitutes the scintillator).

These methods of the prior art exhibit the disadvantage of requiring mechanical movements, especially of the film or of the sensor, in order to take two successive plates, and one of the major disadvantages resides in that these images obtained in succession do not permit avoidance of the movements of the patient: this results in a poor superposability of the two plates and consequently a poor spatial resolution.

One of the objects of the invention is to permit the processing of two simultaneous images referred to as two-energy images of a same zone examined, each corresponding to a different energy spectrum of the X-rays, in such a manner as to permit a perfect superposability of the plates. This is obtained with the aid of a surface sensor of the type including a matrix of photosensitive elements, i.e. not necessitating any mechanical movement during the taking of images and supplying from a single X-ray irradiation of an object or patient, the two images mentioned hereinabove.

In order to construct matrices of photosensitive elements, it is conventional to provide an array of line conductors and an array of column conductors, and at each crossing of a line and of a column, a photosensitive point is formed. The number of photosensitive points in a given surface determines the resolution of the image. Each photosensitive point is connected between a line conductor and a column conductor. In fact, to each line conductor there are connected as many photosensitive points as there are columns of the latter, and to each column conductor there are connected as many photosensitive points as there are lines of the latter.

In order to reduce the space requirement of a photosensitive point, that is to say, in fact, in order to increase the resolution by accommodating a larger number of photosensitive points within a given surface, matrices of photosensitive elements have been proposed, in which each photosensitive point consists of a photodiode in series with a capacitor; the capacitor being employed, on the one hand, to store the charges created by an illumination of the photodiode, and being employed, on the other hand, to isolate the photodiode from the column conductor when the line corresponding to this photodiode is not selected, in the course of the reading of the photosensitive point. The French Pat. No. 86/00656 published under the no. 2,593,319 describes a reading process and the detailed operation of a photosensitive matrix of elements in which each photosensitive point consists of a photodiode and a capacitor in series, between a line conductor and a column conductor.

Another French Pat. No. 86/00716, published under no. 2,593,343, describes a process for the manufacture of a matrix of photosensitive elements as explained hereinabove, as well as a process for reading and an application of this matrix to the taking of images, especially radiological images. One of the advantages of this type of structure is that of permitting the construction of matrices of large dimensions, on account of the fact that the thin-layer deposits, for example of amorphous silicon, are now well controlled.

In order to obtain two-energy images by means of a matrix of photosensitive elements as represented in FIGS. 5a, 5b, 6a and 6b of the French Pat. No. 86/00716 cited hereinabove, it is sufficient to add a second scintillator to the first scintillator referenced 9 in the Figures, intercalating this second scintillator between the substrate referenced 1 in these Figures and the first level of conductors which is referenced 2; each scintillator having an optimal sensitivity for X-rays of different energy. It is, of course, necessary moreover to introduce into this structure two additional levels in an "opaque-transparent" chequered configuration, which are disposed between the scintillators and the photodiodes, in such a manner that certain photosensitive points see only the light originating from one of the scintillators and that the other photosensitive points see only the light originating from the other scintillator.

This solution, which is relatively simple to implement technologically, does, however, exhibit the . disadvantage of supplyinq two two-energy images, separately exhibiting a resolution and a space factor which are one half as compared with the single-energy images, on account of the fact that, on two adjacent photosensitive points, one is affected by the first image and the other by the second image.

SUMMARY OF THE INVENTION

Further, another object of the invention is to permit the construction of photosensitive detectors, of the linear or matrix type, each photosensitive point of which is capable of storing two different information items, thus permitting the obtaining, with especially a radiological image detector, of two images each corresponding to a different energy of the X-rays and each exhibiting a resolution and a space factor which are equivalent to single-energy images.

According to the invention, a matrix of photosensitive elements including an array of line conductors and an array of column conductors, an array of photosensitive points, is defined in that each photosensitive point includes, between a line conductor and a column conductor, two photosensitive elements connected in series with a capacitor, the two photosensitive elements being connected head to foot.

BRIEF DESCRIPTION OF THE DRAWINGS

The invention will be better understood, and other features and results of the invention will emerge from the description which follows, which is given by way of non-limiting example, and illustrated by the five accompanying Figures in which.

DETAILED DESCRIPTION OF THE INVENTION

Figure 1:
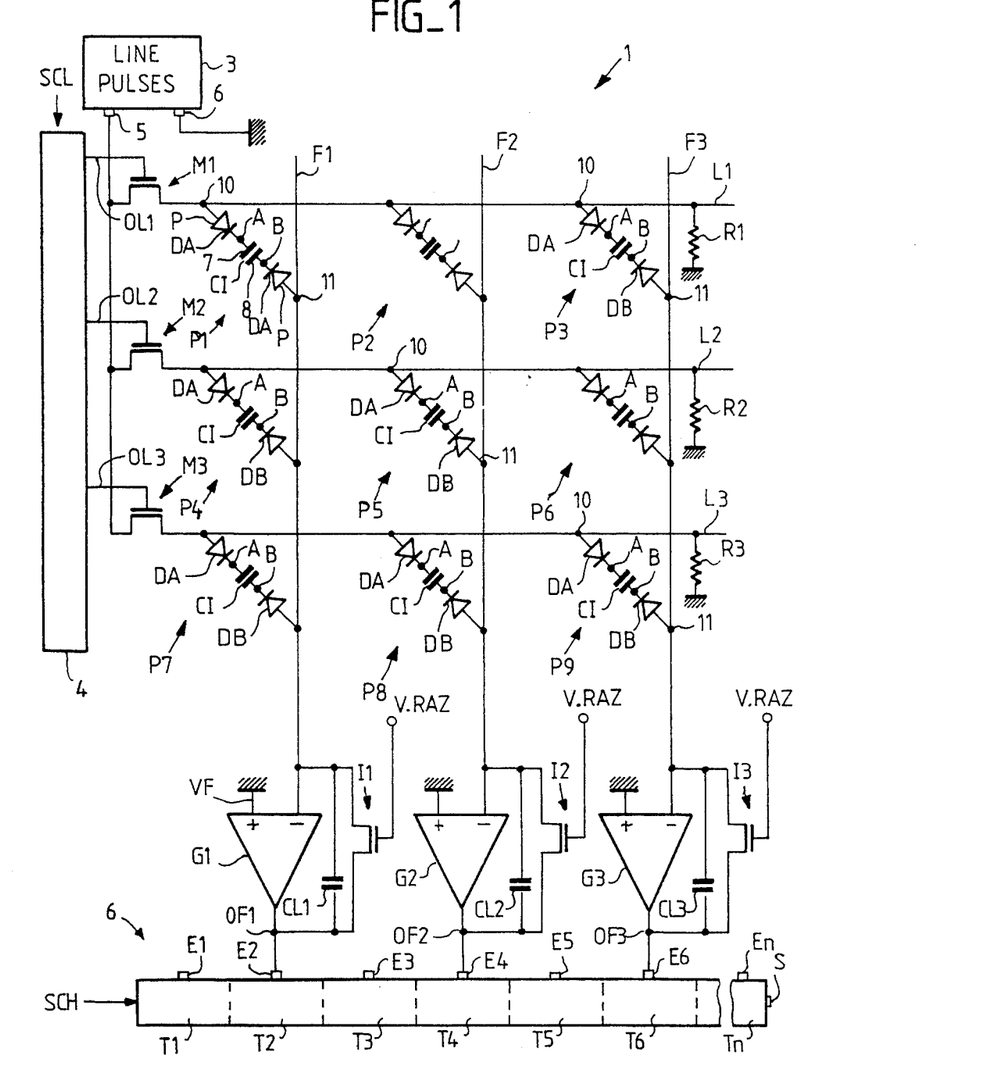
FIG. 1 is a diagram showing, by way of nonlimiting example, a matrix of photosensitive elements according to the invention.

FIG. 1 shows a photosensitive matrix 1 according to the invention. The matrix 1 includes an array of line conductors L1, L2, L3 and an array of column conductors F1, F2, F3; in the non-limiting example described, these two types of conductors are each limited to 3, in order to simplify FIG. 1. The matrix includes an array of photosensitive points P1, P2, ..., P9 which are likewise organized in lines and in columns, and which are disposed at the crossing of the line conductors L1 to L3 and of the column conductors F1 to F3; each sensitive point P1 to P9 having one end 10 connected to a line conductor L1 to L3, and a second end 11 connected to a column conductor F1 to F3.

According to a feature of the invention, the photosensitive points P1, P2, ..., P9 each consist of a first and a second photosensitive element DA, DB which are disposed in series with a capacitor CI, the two photosensitive elements DA, DB being disposed head to foot, that is to say that they have inverted conduction directions.

In the non-limiting example of the description, the photosensitive elements DA, DB consist of photodiodes, and the capacitor CI is disposed between the two photodiodes.

It should likewise be noted that it is the anodes or p zones of the photodiodes DA, DB which are connected to the line conductors L1 to L3 and to the column conductors F1 to F3, and the cathodes or n zones of these photodiodes which are connected to the capacitor CI, but within the spirit of the invention the direction of the photosensitive diodes might just as well be inverted.

It is thus possible, with each one of the photosensitive points P1 to P9, to store two different information items, in such a manner, for example, as to produce two radiological images each corresponding to a different energy of the X-rays. This may be obtained by converting the X-rays into visible light and by exposing each photodiode DA, DB to the light having the desired origin; this permits, on the one hand, within a zone A situated between a first plate 7 of the capacitor CI and the cathode of the first photodiode DA, and forming a first floating-potential point, the storage of a first information item or quantity of charge QA linked to the illumination of the first photodiode DA; and, on the other hand, within a second zone B, forming a second floating-potential point situated between the second plate 8 of the capacitor CI and the cathode of the second photodiode DB, the storage of a second information item or quantity of charge QB linked to the illumination of the second photodiode DB.

At the location of a storage zone A or B, the information items or charges QA or QB are created and reverse, in accordance with an operation similar to that which is explained for a cell incorporating a photodiode and a capacitor in the French Patent applications No. 86/000,656 and 86/00,716 to which reference has already been made.

The reading of the storage zones A, B is then carried out by a return to direct biasing of the photodiodes A, B.

These operations are carried out by applying to each photosensitive point P1, ... P9 a line voltage VL in the form of pulses of appropriate polarities and amplitude, which are referred to as line signals SL and produced by a pulse generator 3.

In the non-limiting example described, the line conductors L1 to L3 are connected to an output terminal 5 of the pulse generator 3 via MOS transistors M1, M2, M3 forming line switches controlled by the outputs OL1, OL2, OL3 of a shift register 4 referred to as the line register. This register is controlled by a line shift control signal SCL. Thus, when a line of photosensitive points P1 to P3 or P4 to P6 or P7 to P9 is selected, the corresponding line conductor L1 to L3 is connected to the pulse generator 3, in such a manner that the line signals are applied to all the photosensitive points connected to this line conductor. It should be noted that, in order to maintain the line conductors L1 to L3 at a fixed potential, when the line switches M1, M2, M3 are open (non-conducting), each line conductor L1, L2, L3 is connected to ground by a resistor R1, R2, R3; these resistors R1 to R3 having a value which is high in relation to the resistance presented by the line switches M1 to M3 when the latter are closed (conducting state).

In the non-limiting example of the description, each column conductor F1 to F3 is connected to the negative input "−" of an operational amplifier G1 to G3, mounted as integrator with the aid of an integrating capacitor CL1 to CL3. The integrating capacitor CL1 to CL3 is connected between the negative input "−" of the amplifier G1 to G3 and the output OF1, OF2, OF3 of the latter. The second input or positive input "+" of each amplifier G1 to G3 is connected to a column reference potential VF which, in the non-limiting example described, is ground.

Each integrating amplifier G1 to G3 further includes a reset-to-zero switch I1 to I3 connected in parallel with the integrating capacitor CL1 to CL3.

The reset-to-zero switch I1 to I3 of a given integrating amplifier G1 to G3 is maintained closed, in such a manner as to short-circuit the integrating capacitor CL1 to CL3, except during the reading sequence of the zones A, B of a photosensitve point which is connected to this amplifier.

In the non-limiting example described, the switches I1 to I3 consist of MOS tran-sistors controlled by reset-to-zero signals V-RAZ.

Thus, at rest, the column conductors F1 to F3 are at the potential zero volt or ground; the same is true for the line conductors L1 to L3, the voltage VL of the line signals being referenced in relation to ground, the second terminal 6 of the generator 3 is connected to ground.

The outputs OF1, OF2, OF3 of the integrating amplifiers G1, G2, G3 are connected to reading and multiplexing means including an analog data acquisition device 6 which consists, for example, of a shift register having n acquisition stages T1, T2, ... Tn with parallel inputs E1, E2, ..., En and a series output S, for example of the CCD type.

In the non-limiting example described, with a view to avoiding a superposition, within a same acquisition stage, of the signals corresponding to the two charges Q1, Q2 (previously mentioned) delivered in succession by each photosensitive point P1 to P9, two adjacent acquisition stages are intended to be charged in succession by a same output OF1, OF2, OF3 of amplifier G1, G2, G3.

To this end, the outputs OF1, OF2, OF3 are connected, for example, respectively to the second, fourth and sixth inputs E2, E4, E6 in such a manner as to charge, in a first period of time, the corresponding acquisition stages T2, T4, T6, and then to charge, in a second period of time, the acquisition stages, T1, T3, T5, after having effected a shift of the stages with the aid of a horizontal shift signal SCH applied to the control input 10 of the acquisition device 6.

The reverse biasing of the photodiodes DA, DB may be implemented either for all the photosensitive points P1 to P9 simultaneously, by making all the line switches M1, M2, M3 conducting or solely for the photosensitive points connected to a same line conductor: for example the first, second and third photosensitive points P1, P2, P3 if it is the first line switch M1 which is made conductive.

The reading of a photosensitive point P1 to P9 may be carried out subject to the double condition that, the line conductor L1 to L3 to which it is connected is connected to the pulse generator 3 (the corresponding line switch M1 to M3 being in the conductive condition), and that the integrating capacitor CL1 to CL3 to which it is connected by a column conductor is not short-circuited (the corresponding reset-to-zero switch being in the blocked or open condition).

Thus, for example, the simultaneous reading of the first three photosensitive points P1, P2, P3 is possible, if the first line switch M1 is conductive and if the three reset-to-zero switches I1, I2, I3 are open.

Figure 2:
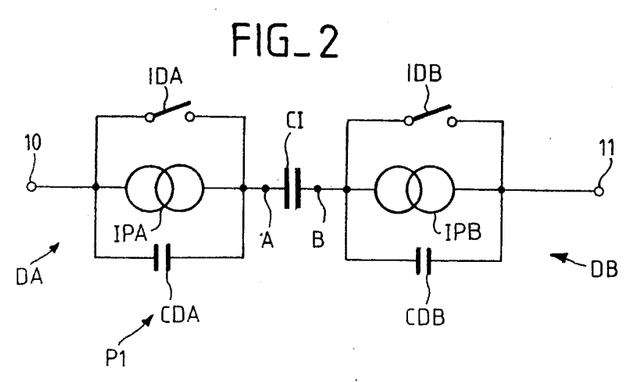
FIG. 2 is the equivalent electrical diagram of a photosensitive point shown in FIG. 1.

FIG. 2 shows the equivalent diagram of a photosensitive point, for example the first photosensitive point P1.

Assuming, in order to simplify the explanations, that on the one hand the photodiodes DA, DB have a zero current when they are biased in reverse and that they are in darkness, and that, on the other hand, they have a zero impedance when they are forward-biased, under these conditions, each photosensitive diode DA, DB may be represented by three parallel elements, namely:

a capacitor CDA, CDB, which is the capacitance presented by the photodiode when it is biased in reverse;

a current source IPA, IPB, which has the value of the photocurrent;

and a switch IDA, IDB which is conducting, that is to say closed, when the photodiode DA, DB is forward-biased and which is blocked, that is to say open when the photodiode is biased in reverse.

Figures 3A, 3B:
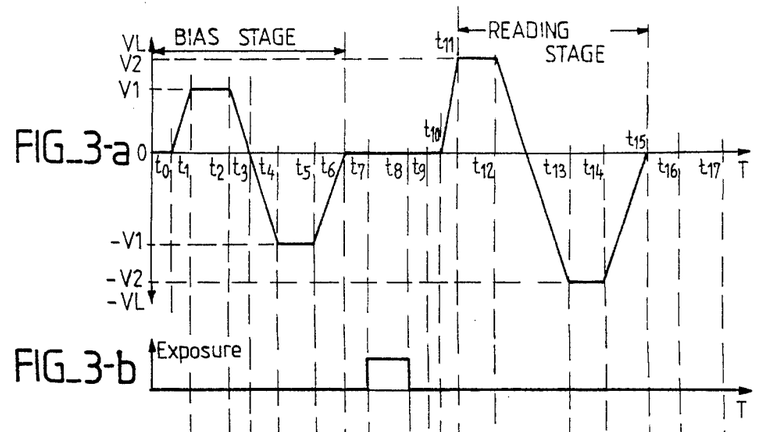
FIGS. 3a, 3b, 3f represent signals explaining the operation of a matrix according to the invention.
Figure 3C:
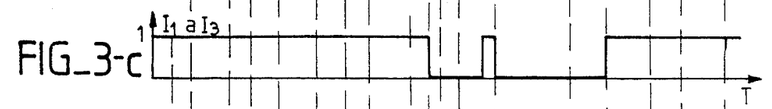
Figure 3D:
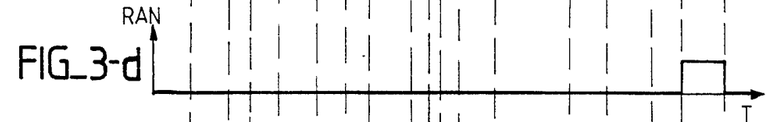
Figure 3E:
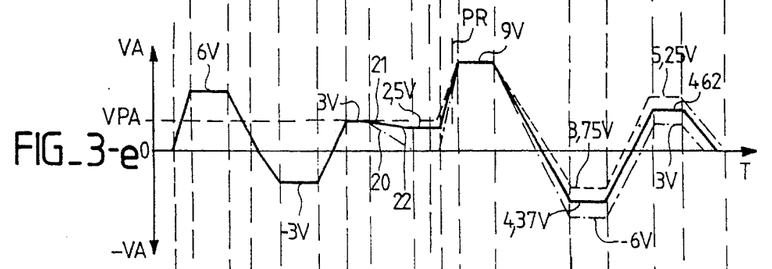
Figure 3F:
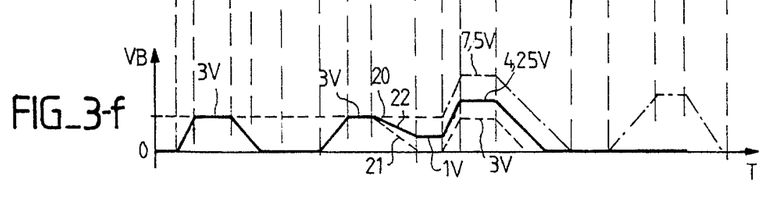

FIGS. 3a to 3f are diagrams which show the various signals applied or obtained in the course of a complete cycle of operation of a photosensitive point P1 to P9:

FIG. 3a represents the line voltage VL, delivered by the pulse generator 3, and its development over a cycle;

FIG. 3b illustrates the phase of illumination of the photosensitive elements DA, DB, that is to say, in the case of radiological images, the phase of exposure of a patient to the X-rays;

FIG. 3c illustrates the change of condition of the reset-to-zero switches I1 to I3 which are connected in parallel with the integrating capacitors CL1 to CL3;

FIG. 3d represents a step of general reset-to-zero or reset to level RAN of the photosensitive elements;

FIG. 3e and FIG. 3f show respectively the form of signals VA and VB formed respectively at the zones or points A and B in relation to the application of the line voltage VL and the exposure to light of the photosensitive elements DA and DB.

The numerical values indicated in FIGS. 3a, 3e and 3f are given solely by way of non-limiting example, and correspond, in particular, to the particular case where the equivalent capacitances CDA and CDB exhibited respectively by the photosensitive diodes DA and DB have the same value as the series capacitance CI connected in series with the photodiodes DA, DB, that is to say that CDA=CDB=CI.

In FIG. 3a, at an instant t0, the line voltage VL is at zero and increases to reach a first positive value V1 of the order of 6 volts at an instant t1; the line voltage VL remains substantially stable until a second instant t2, with effect from which it diminishes so as to pass through zero at an instant t3 (marking the end of a first positive pulse) and to become more negative until an instant t4 when it reaches a first negative value −V1, of approximately −9 volts; the line voltage VL remains substantially stable at the value −V1 until an instant t5 when it decreases so as to revert to zero at an instant t6 (marking the end of a first negative pulse). This constitutes a phase of reverse biasing of the photodiodes DA, DB.

In FIGS. 3e and 3f, the voltages VA and VB are at zero before the instant t0 and follow the development of the line voltage VL but with different values. In fact, at the instant t1 the first photodiode DA is conducting while the second photodiode DB is blocked; furthermore, between the instants t0 and t1 the voltage VB (shown in FIG. 3f) follows the voltage VL in the ratio CI/CI+CDB (CDB being the equivalent capacitance of the second photodiode DB), in such a manner that at the instant t2 the voltage VB has a positive value in the order of 3V. With effect from the instant t2 when the line voltage VL begins to decrease so as to pass from the first positive value V1 to zero, the voltage VA at the point A varies more slowly than the line voltage VL, in such a manner that the first photodiode DA is blocked with effect from the third instant t2. When the voltage VB at the point B reaches 0 between the instant t3 and the instant t4, the second photodiode DB becomes conducting and remains conducting until the instant t5, at which the end of the negative stage of the line voltage VL is situated; the voltage VA at the point A then has a value of substantially −3 volts.

With effect from the instant t5, when the line voltage VL decreases so as to pass from the first negative value −V1 to the value zero at the instant t6, the second photodiode DB is again biased in reverse and then constitutes a capacitor CDB and the voltages VA and VB respectively at the points A and B vary in the same direction as the line voltage VL so as each to reach a positive voltage in the order of 3 volts, which represents the reverse biasing voltage VPA, VPB of these photodiodes. The two photodiodes DA, DB are thus finally biased in reverse, and it is noted that, if the successively positive and negative values V1, −V1 of the line voltage VL have been well chosen, the two photodiodes DA, DB may be biased in reverse at a same value, as in the example described.

It should be noted that with effect from the instant t2, when the line voltage VL decreases from the positive voltage V1, until the instant t3, when the line voltage VL passes to zero, the two photodiodes DA and DB are both biased in reverse, so that a single positive (or negative) pulse may be sufficient to bias in reverse at the same time the two photodiodes DA and DB. Nevertheless, it is beneficial to follow the biasing phase by a negative pulse in order to obtain, as in the example described, values of biasing voltage VPA, VPB which are identical for the two photodiodes DA and DB.

The two photodiodes DA, DB being biased in reverse, they remain, between the instant t6 and the instant t7 in a stabilization phase, and then they are subjected to an exposure or illumination phase which results, as has been mentioned previously, from the exposure of an object or of a patient to X-rays.

This illumination phase is symbolized in FIG. 4b, between an instant t7 and an instant t8. During this period of exposure, the photodiodes DA, DB generate photocharges which are distributed on the capacitors CDA, CI, CDB of the photosensitive points; consequently, a charge is injected on the column conductor, but this charge is not taken into account by the integrating amplifier G1 to G3, on account of the fact that the reset-to-zero switch I1 to I3 is closed and thus short-circuits the integrating capacitor CL1 to CL3.

During the period of exposure included between the instant t7 and the instant t8, the voltages VA and VB at the point A and B respectively may develop as a function of the intensity of this exposure, this being an exposure which may, of course, be different for the first and for the second photodiode DA, DB. It is possible to consider two extreme cases and an intermediate case, which are each represented by a curve in relation to the voltages VA and VB, that is to say in relation to FIGS. 3e and 3f:

the first extreme case is represented by a curve 20 (in mixed lines), and corresponds to the case where the voltage VA at the point A which has the value of the biasing voltage VPA, has been reduced to 0 volt in consequence of the charges created during the period of exposure, while the point B has not received any light, so that the voltage VB has not been modified and has retained the value of the biasing voltage VPB;

a second curve 21 (in dashes) corresponds to the second extreme case, this being the case opposite to that explained hereinabove, that is to say to the case where the voltage VB at the point B has been reduced to 0 volt by the illumination, while the point A has not received any light;

the third curve 22 in solid lines corresponds to the intermediate case where each one of the photodiodes DA, DB has been illuminated, so that for example: the voltage VA at the point A has been modified by the illumination and has been diminished so as to pass from 3 volts to 2.5 volts, for example; and so that likewise the voltage VB at the point B has passed from 3 volts to a lower value, for example to 1 volt.

These latter values of the voltages VA and VB are preserved from the end t8 of the period of exposure up to an instant t10, when a reading phase commences.

Prior to this reading phase, that is to say at an instant t9 included between t8 and the instant t10, the reset-to-zero switch I1 to I3 changes its condition and passes from the closed condition (0) to the open condition (1), so as no longer to short-circuit the integrating capacitors CL1 to CL3.

The reading phase commences by the application of a second positive pulse (represented in FIG. 3a) to the line conductor, that is to say that the line voltage VL which is at 0 volt at the instant t10 passes, at the instant t11, to a positive voltage having a second value V2 which is greater than the first positive value V1, 9 volts for example: having regard to the conditions previously described, this order that the latter should regain, before reaching its maximum, the value of the voltage VA at the point A which does, of course, likewise increase (just like the voltage VB at the point B). It is, in fact, necessary to cause the first photodiode DA to change to forward, this taking place even in the most unfavourable case, which is that where the voltage VA is at its maximum positive value, this case being represented by the second curve 21 and corresponds to a zero illumination of the first photodiode DA; in the non-limiting example described, it is at a value of approximately 7.5 volts that the point of regaining PR is situated for the intermediate case represented by the third curve 22, at an instant which very slightly precedes the instant t11 when the line voltage VL reaches its second positive value V2.

The change to forward of the first photodiode DA modifies the distribution and the values of the charges accumulated on the various elements of the photosensitve point, and causes the injection of a third charge referred to as the reading charge Q1 on the column conductor and into the integrating amplifier which is connected to it: this reading charge Q1 is a linear combination of the first and of the second charge QA, QB or first and second information items which are themselves respectively proportional to the illumination of the first and of the second photosensitive element DA, DB.

Between the instant t11 and the instant t12, the line voltage VL maintains its second positive value V2 of 9 volts; this is the case likewise for the voltage VA at the point A, on account of the fact that the first photodiode DA is then conducting. The voltage VB at the point B is likewise stable and, in accordance with one of the cases previously mentioned, it may have a value of 7.5 volts in the first case represented by the first curve 20, or a value of 3 volts in the second case represented by the second curve 21, or again a value of approximately 4.25 volts in the third intermediate case represented by the third curve 22.

Slightly before the instant t12, the reading charge Q1 then being correctly acquired, the reset-to-zero switch I11 (FIG. 3c) is then closed (condition 1) so as to short-circuit and to reset to zero the integrating capacitor CL1, and then the reset-to-zero switch I1 is again reset to the open condition (condition 0) with a view to effecting the acquisition of a second reading charge Q2.

With effect from the instant t12, the line voltage VL decreases and passes through zero so as to reach a second negative value −V2 at an instant t13, this second negative voltage −V2 being in the order of −13.5 volts in the non-limiting example described. During this last variation of the line voltage VL, the first photodiode VA changes to reverse, and then for a certain value of the line voltage VL, the second photodiode DB changes to forward. The negative value of VL must then be such that the second diode DB still changes to forward: the most unfavourable case being that where the voltage VB at the point B is maximum at the instant t12. What is found here is the same principle as that explained hereinabove in order to obtain the change to forward of the first photodiode DA (for the change to forward of the second photodiode DB, the most unfavourable case corresponds to that represented by the first curve 20 and under the conditions which have been previously defined the line voltage must then be negative, with an amplitude greater than or equal to 13.5 volts).

The change to forward of the second photodiode DB modifies the values of the charges on the various elements of the photosensitive point and causes the injection of this second reading charge Q2 into the integrating amplifier G1. This second reading charge Q2 is proportional to the second charge QB or second information item QB created at the second point B by the illumination of the second photosensitive element DB.

Between the instant t12 and the instant t13, the variation of the line voltage VL has caused, in a same direction, a variation of the voltages VA and VB: the voltage VA at the point A has changed to a negative level which may have, in accordance with the three cases previously mentioned, one of the three values represented by the first, second and third curves 20, 21 and 22 and which correspond respectively, in the non-limiting example described, to −3.75 volts, −6 volts and −4.37 volts. In the same time, the voltage VB at the point B is at 0 volt, the second photodiode DB being on forward, that is to say conductive.

At the end of the stage formed between the instant t13 and the instant t14, the line voltage VL reverts to zero at the instant t15 and determines a variation, in the same direction, of the voltages VA and VB developed at the points A and B. It should be noted that, in the same time, that is to say at the instant t14, the second reading charge Q2 having been acquired, the reset-to-zero switch I1 (FIG. 3c) is again closed. The points A and B then have a voltage VA, VB which is positive and stable and the photodiodes DA and DB are both biased in reverse.

The reading of the points A and B has not effaced at these points the presence of the charges associated with the illumination of the photodiodes DA, DB. This appears clearly in FIG. 3e, which shows that the voltage VA at the point A has a lower value with the third curve 22 (4.62 V) than with the second curve 21 (5.25V). It is thus necessary to erase these information items before the following cycle. This is carried out between an instant t16 and an instant t17 by a reset to level pulse RAN, symbolized by a square formation in FIG. 3d and which permits the restoration to the voltages VA, VB of the points A and B of their original level, that is to say the level 0 volt in the non-limiting example described.

In the non-limiting example of the description, the reset to level RAN is of the optical type: there is passed to the photodiodes DA, DB a quantity of light sufficient to reduce the voltages VA, VB of the points A and B to 0 volt, as represented in FIGS. 3e and 3f with effect from the instant t16.

It is then possible to commence the following cycle.

Based on the reading charges Q1, Q2, it is possible to compute the information items QA and QB with the aid of the following two relations:

$$Q1 = QA\alpha + QB \frac{CI(1-\gamma) - CDB\gamma}{CI + CDB} ; \qquad (1)$$

$$Q2 = QB \cdot \frac{CDA \cdot CI}{(CI + CDA)(CI + CDB)} ; \qquad (2)$$

where QA and QB correspond respectively to the first and the second information items: CI is the capacitance which, in a photosensitive point, is in series with the two photosensitive elements DA and DB; CDA is the equivalent capacitance of the first photosensitive element DA; CDB is the equivalent capacitance of the second photosensitive element DB; α and γ are known respectively by the third and fourth relations which follow:

$$\alpha = \frac{\frac{CI \cdot CDB}{CI + CDB}}{\frac{CI \cdot CDB}{CI + CDB} + CDA} \qquad (3)$$

$$\gamma = \frac{\frac{CI \cdot CDA}{CI + CDA}}{\frac{CI + CDA}{CI + CDA} + CDB} \qquad (4)$$

Thus, for example
if CDA=CI=CDB :

$$Q1 = \tfrac{1}{3}QA + 1/6 \ QB, \text{ and } Q2 = -\tfrac{1}{3}QB;$$

if CDA=CI=2 CDB :

$$Q1 = \tfrac{1}{3}QA + 1/6 \ QB, \text{ and}$$

$$Q = -2\tfrac{1}{3}QB ;$$

if CI=2CDA=2CDB :

$$Q1 = 2/5 \ QA + 4/15 \ QB, \text{ and}$$

$$Q2 = 2/9 \ QB.$$

This description of the operation of an isolated photosensitive element P1 may be applied to all the photosensitive points P1 to P9, that is to say to the entire photosensitve matrix 1 represented in FIG. 1. In the non-limiting example of FIG. 1, the matrix includes a number of line conductors and column conductors L1 to L3 and C1 to C3 which is deliberately limited for the sake of greater clarity of the description, and consequently this matrix includes a small number of photosensitive points, but, of course, the invention may be applied to far larger photosensitive matrices, having, for example, several million photosensitive points to form an image of 40 cm×40 cm. As compared with conventional photosensitive matrices, the photosensitive matrix 1 according to the invention exhibits by way of difference, in particular, that each photosensitive point from P1 to P9 may store two different information items, so that the photosensitive matrix 1 of the invention permits the performance of simultaneous acquisition of the information items relating to two different images. The global operation of the photosensitive matrix 1 is the following, and is inferred from the explanations given hereinabove.

1 - the pulse generator 3 (represented in FIG. 1) passes to all the line conductors L1 to L3, simultaneously or with a shift, a positive pulse and then a negative pulse (which are represented in FIG. 3a between the instant t0 and the instant t6; it being possible for the duration for these two pulses to be within the range between 1 and 5 ms). All the photodiodes DA and DB are then biased in reverse, and all the reset-to-zero switches I1 to I3 are closed.

2 - there then elapses a waiting time (of several milliseconds).

3 - then between the instant t7 and the instant t8 there occurs a flash of X-rays which, in consequence of a conversion of wavelength by means of two scintillators (shown in FIG. 5), determines the illumination of all the photosensitive points of the matrix, during a time within the range of, for example, between 10 ms and 100 ms.

4 - the pulse generator 3 then delivers a second positive pulse, and a second negative pulse (represented in FIG. 3a between the instant t10 and the instant t15). As the reset-to-zero switches I1 to I3 are open, reading charges Q1, Q2 are recovered, which, in the form of voltage, are present at the output OF1 to OF3 of the amplifiers G1 to G3; these reading charges Q1, Q2 permit a knowledge of the information items QA, QB which are stored at the points A and B. It should be noted that, if the switches I1 to I3 are activated in accordance with the example represented in FIG. 3c, what is obtained is first of all Q1 and then subsequently Q2; however, it is likewise possible, if the reset-to-zero switches I1 to I3 are always left open between the instant t9 and the instant t14, to obtain first of all Q1 and then subsequently Q1 +Q2.

The information items available at the output OF1 to OF3 of the amplifiers G1, G3 are loaded by the acquisition device 6 and then passed to a computer (not shown, of conventional type), which computes the values of the first and second charges or information items QA and QB from the reading charges Q1 and Q2, the values of QA and QB being subsequently stored. During the present phase 4 of the operations, the other line conductors L2, L3 of the matrix 1 are maintained at zero, the duration of this phase being typically in the order of 1 ms.

5 - the phase 4 hereinabove is repeated line after line for all the line conductors of the photosensitive panel or matrix 1. The two images which were sought are thus obtained in the computer.

6 - what is then performed is a general reset to level RAN, that is to say which is common to all the photosensitive points of the matrix 1, and the duration of which is, for example, in the order of 10 ms to 100 ms (this general reset to level being symbolized in FIG. 3d between the instant t16 and the instant t17).

Figure 4:
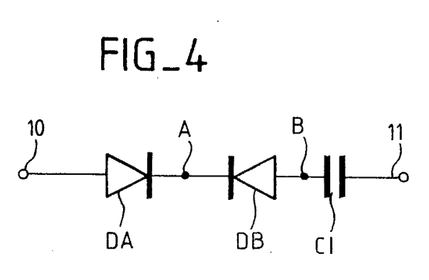
FIG. 4 is the diagram of a photosensitive point according to a variant of the invention.

The explanations given hereinabove concerning the operation of a photosensitive matrix 1 according to the invention are valid not only for one or some photosensitive points as represented in FIG. 1, but are likewise valid with a different relative disposition between the two photosensitive elements DA, DB and the series capacitor CI, as is represented in FIG. 4.

FIG. 4 shows a photosensitive point, for example the first photosensitive point P1, in accordance with a form which differs from that represented in FIG. 1 in that the series capacitor CI is no longer situated between the two photodiodes D.A, DB, but that the series connection is formed by a first and a second photodiode DA, DB which are followed by the series capacitor CI (or, of course, the reverse). What is important is that these three elements, namely the two photodiodes DA., DB and the series capacitor CI are connected in series, and that the two photodiodes DA, DB are disposed head to foot. In this perspective, it should likewise be noted that the photodiodes, DA, DB may be replaced by phototransistors, subject to the condition that the latter are well chosen, that is to say constituted, for example, by phototransistors of NIPIN or PINIP type.

Figure 5A:
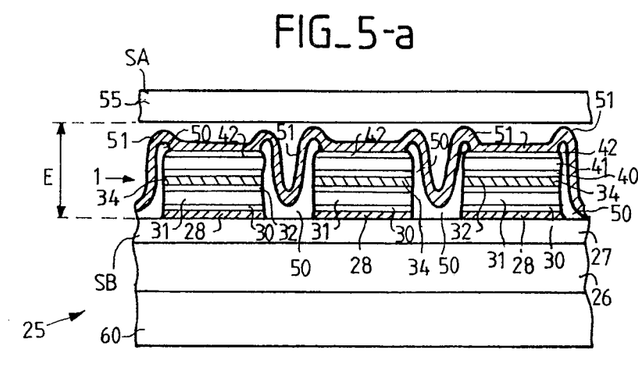
FIGS. 5a and 5b are lateral cross-sections along two orthogonal directions of a device for detecting images utilizing the matrix shown in FIG. 1.
Figure 5B:
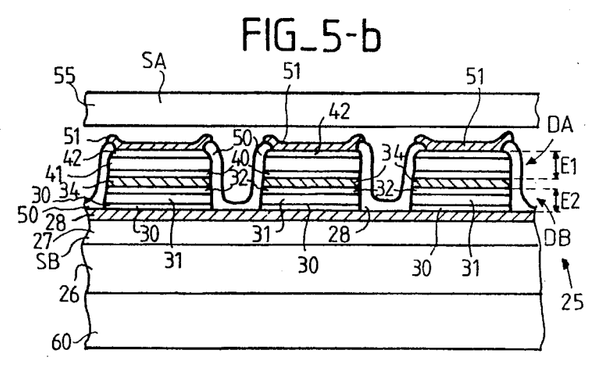

FIGS. 5a and 5b are lateral cross-sections along two orthogonal directions which show, by way of non-limiting example and in a diagrammatic manner, a preferred embodiment of a two-energy radiological image detector 25, comprising a photosensitive matrix as previously described.

The image detector 25 includes a support or substrate 26, for example of glass. A scintillator layer 27 formed of a scintillator substance which is deposited on the substrate 26

The scintillator substance is chosen as a function of its maximum sensitivity within a certain energy range of the incident X-rays. For example, gadolinium oxysulphide doped with terbium is known to have an optimal sensitivity for X-rays, the energy of which is in the order of 50 KeV and to emit in response a green light of wavelength 0.54 micron. Thus, for example, the scintillator layer 27 may consist of a gadolinium oxysulphide powder embedded in a thermosetting resin, in such a manner as to constitute a sheet; this sheet is subsequently affixed onto the substrate 26. The scintillator layer 27 has a thickness which is chosen to optimize the efficiency of the photon production without an excessive loss in relation to the resolution. This thickness may range from a few tens to a few hundreds of micrometers for radiological imagery applications.

A thin conductive layer 28 of conductive material, which is transparent or partially transparent to the light emitted by the scintillator layer 27, covers this scintillator layer 27 either directly or via, for example, an intermediate insulating layer (not shown) which permits, especially, the flattening of the upper surface of the scintillator layer 27 and the formation of a barrier to a diffusion of impurities. The thin conductive layer 28 may be made of indium-tin oxide, for example, and it is engraved in such a manner as to form the column conductors such as the column conductors C1, C2, C3.

The conductive layer 28 is, in its turn, covered by a stack of a plurality of layers 30, 31, 32 which, after engraving, constitute the second photodiodes DB which have been previously described. In the non-limiting example described, the photodiodes DB are of the PIN type, that is to say that on the conductive layer 28 (which is intended to form the column conductors) there is found, first of all, a layer 30 of hydrogenated amorphous silicon, for example by chemical decomposition in the gas phase (CVD); the hydrogenated amorphous silicon of this layer 30 is doped with a type-P impurity, for example with boron.

There is then found, on top of the layer 30 of doped silicon, the layer 31 of intrinsic hydrogenated amorphous silicon.

There is then deposited on the intrinsic silicon layer 31, a layer of hydrogenated amorphous silicon 32 doped with a type-N impurity, for example with phosphorus.

On top of the three layers 30, 31, 32 forming the second photodiodes DB, there is found an insulating layer 34 which forms the dielectric of the capacitors CI which have previously been shown and which are connected in series between the photodiodes DA, DB. In the non-limiting example described, the layer 34 forming the dielectric of the capacitors (CI) consists of silicon nitride.

On top of the insulating layer 34 there is found a second stack of three layers 40, 41, 42 which serve to form the first photodiodes, DA, in such a manner that on top of the layer 34 there are found in succession a layer of hydrogenated amorphous silicon 40 doped with a type-N impurity, then a layer of intrinsic hydrogenated amorphous silicon 41, and then a layer of hydrogenated amorphous silicon 42 doped with a type-P impurity. The three layers 40, 41, 42 intended jointly to form the first photodiodes DA, and the insulating layer 34 (dielectric) are engraved as the three layers 30, 31, 32, which form the second photodiode DB, that is to say engraved in accordance with a pattern of islets placed at each of the crossing points of the column conductors and of the line conductors of the matrix. The capacitors CI consist of the insulating layer 34 situated between two type-N regions which are formed by the layer 32 of the second photodiode DB, and by the layer 40 of the first photodiode DA.

It should be noted that the construction process may likewise consist in depositing, in succession, all the layers 30, 31, 32, 34, 40, 41, 42 which constitute the two photodiodes DA, DB with, between the latter, the dielectric of the capacitor CI, and then in subsequently engraving these layers in a same operation.

This assembly is covered with a new insulating layer 50, which may be, for example, made of the same material as the insulating layer 34 which forms the dielectric of the capacitors CI.

Openings are constructed in the latter insulating layer 50 above the first photodiodes DA in such a manner as to permit the establishment of their contact with an upper conductive layer 51 which is engraved in order to define the line conductors L1 to L3 of the matrix. Just like the lower conductive layer 28 serving to construct the column conductors, the upper conductive layer 51 is transparent and it is constructed, for example, of indium-tin oxide.

Finally, opposite the substrate 26 a second scintillator layer 55 terminates the structure, and covers the upper conductive layer 51 on which it is affixed or pressed with a bond which is transparent to the light (not shown).

The scintillator substance which forms the second scintillator layer 55 is chosen as a function of the energy range of the X-rays, for which range it exhibits a maximum sensitivity. The maximum sensitivity being exhibited, of course, for an energy range of the X-rays which is different from that of the first scintillator layer 27. Thus, for example, in the case of the second scintillator layer 55, the latter may be formed by yttrium oxide, in such a manner as to exhibit an optical sensitivity for X-rays of 20 KeV; the yttrium oxide of the second scintillator layer 55 may be doped, for example, with terbium.

In this structure, it is observed that the photosensitive points of the matrix are constructed by a stack of layers in the direction of a thickness E of the matrix 1, namely three layers 30, 31, 32 for the second photodiodes DA, then an insulating layer 34 to form the capacitors CI, then three layers 40, 41, 42 to constitute the first photodiodes DA, all these layers being disposed between conductive layers 28, 51 forming respectively the column conductors and the line conductors. One of the advantages of such a structure is that of minimizing the lateral space requirement of each photosensitive point for each one of which two photodiodes DA, DB are thus superposed. This structure is all the more advantageous as each point must be sensitive to rays (of light) of differing origin; this is obtained by placing the matrix structure which has just been described in a sandwich between the first and the second scintillator layers 28, 55.

Assuming that the X-rays (not shown) arrive on the side of the scintillator layer 55 disposed opposite the substrate 26 (in such a manner as to avoid the absorbtion of the X-rays by the substrate 26), this scintillator layer is referred to, in the following part of the description, as the first scintillator layer SA, having regard to the direction of propagation of the X-rays. The X-rays pass, first of all, through the first scintillator layer SA and the first photodiodes DA, and then pass subsequently through the second photodiodes DB, and the other scintillator layer be noted that the X-rays are not absorbed to a significant extent except by the scintillators SA, SB in view of the very small thickness of the semiconductor layers, the thickest of which, the layers 31, 41, have a thickness in the order of 1 micrometer.

The first scintillator SA absorbs principally X-rays having a first energy range (around 20 KeV, for example), and it converts the X-rays which it absorbs into a radiation detectable by the amorphous silicon. The second scintillator B absorbs principally X-rays, the energy of which corresponds to its maximum sensitivity which is situated at energies (for example 50 KeV) which are different from those in the case of the first scintillator SA, the X-rays absorbed being converted into a radiation detectable by the amorphous silicon. The first photodiodes DA situated in proximity to the first scintillator SA sense preferentially the light emitted by the first scintillator SA, and the second photodiodes DB which are situated in proximity to the second scintillator SB, sense preferentially the light emitted by this second scintillator SB.

In fact, in a photosensitive material, amorphous silicon for example, a radiation and especially the light emitted by the scintillator layers SA, SB is absorbed or attenuated in the photosensitive material in such a manner that the energy transferred to this material decreases exponentially with the length of material traversed. The result of this is that, if the first and the second diodes D.A, DB have comparable thicknesses E1 and E2 respectively, the light emitted by the first scintillator layer SA is absorbed and thus detected essentially by the first photodiodes DA, and that the light emitted by the second scintillator layer SB is absorbed and detected essentially by the second photodiodes DB. It should furthermore be noted that, if the thicknesses E1, E2 of the photodiodes DA, DB are sufficient to absorb totally the radiation or light emitted by the scintillator layer which is the closer, what is obtained is a total separation between the two information items supplied by the two scintillator layers SA and SB, and detected respectively by the first and second photodiodes DA and DB. It is possible to indicate, by way of non-limiting example, that satisfactory results have been obtained for thicknesses E1, E2 of the photodiodes DA., DB in the order of 1 micron (we recall that the thickness E1, E2 is given essentially by the thickness of the intrinsic zone).

Such an arrangement is particularly advantageous, in that it permits the performance of the superposition of layers hereinbefore described by layers transparent to the light, so that the reset to level RAN previously mentioned may easily be carried out simultaneously for the two photodiodes, DA., DB of a same photosensitive point, based on a light flash emitted by a single light source; this light flash may serve for a general reset to level of all the photosensitive points of the matrix.

In this case, a light source 60 or reset to level source intended for a general reset to level may be pressed against the substrate 26, for example opposite the second scintillator SB. This light source 60 may consist of moans which are known per se, for example of a luminous plate, or of an array of light-emitting diodes, or of flash tubes, etc . . . .

The second scintillator SB must be transparent or semi-transparent to the light; this is obtained, especially when the scintillator SB is sufficiently thin (with a thickness in the order of 300 micrometers, for example).

If the light source 60 is applied to the substrate 26, opposite the second scintillator SB, the substrate 26 must then itself be transparent. A conventional substrate made of glass is perfectly suitable. The light source 60 may then consist of an array of light-emitting diodes (not shown) which is mounted in such a manner as to form a panel, as in the example described in a French Patent application No. 86/06334.

According to another feature of the invention, with a view to promoting the general reset to level by means of a single light source 60, the latter emits a red light, that is to say a light of greater wavelength than the light emitted by the scintillators SA, SB; this tends to diminish the absorption of the light serving for the general reset to level in relation to the absorbtion of the light emitted by the scintillators SA, SB.

It is likewise possible to effect a material separation between the first and the second photodiodes DA, DB, for example by making opaque the insulating layer 34 which constitutes the dielectric of the capacitors CI. Of course, in this case the reset to level RAN may require another light source (not shown) situated to the side of the first photodiodes DA.

In the description, it has been assumed that the invention was applied to X-ray detectors, especially in medical radiology, but it is applied also to detectors of other radiations, provided that scintillator substances are available which effect the desired conversion of wavelength.

What is claimed is:

1. A device for the conversion of images into electrical signals comprising a matrix of photosensitive elements including an array of line conductors (L1 to L3) and an array of column conductors (F1 to F3) and an array of photosensitive points (PI to P9), wherein each photosensitive point (P1 to P9) includes, between a line conductor (L1) and a column conductor (F1) two photosensitive elements (DA, DB) and a capacitor (CI), the two photosensitive elements (DA, DB) and the capacitor (CI) being connected in series, the two photosensitive elements being connected with directions of conduction which are opposite to one another; and a first and a second scintillator substance (27, 55) which are sensitive to differing energies of an incident radiation and which emit a light which is visible or near visible in response to the incident radiation.

2. The device as claimed in claim 1, wherein the photosensitive elements (DA., DB) are photodiodes.

3. The device as claimed in claim 1, wherein the photosensitive elements (DA, DB) are phototransistors of the NIPIN or PINIP type.

4. The device as claimed in claim 1, wherein the capacitor (CI) is placed in series between the photosensitive elements (DA, DB).

5. The device as claimed in claim 1, in which each photosensitive point (P1 to P9) includes a first and a second end (10, 11) which are connected respectively to a line conductor (L1 to L3) and to a column conductor (F1 to F3), wherein a photosensitive point (P1 to P9) further includes a first and a second zone of floating potential (A, B) where there are stored respectively a first and a second information item (QA., QB) which are produced respectively by the illumination of the first and of the second photosensitive elements (DA, DB).

6. The device as claimed in claim 5, wherein the line conductors (L1 to L3) and the column conductors (F1 to F3) are connected to means (3, G1, G2, G3) for biasing in reverse the photosensitive elements (DA, DB) before their illumination, and then for subsequently forward-biasing them in order to obtain two reading charges (Q1, Q2) associated with the information items (QA, QB) stored in the zones (A, B) of floating potential.

7. The device as claimed in claim 6, wherein the means for biasing the photosensitive elements (DA, DB) include a pulse generator (3).

8. The device as claimed in claim 7, wherein the pulse generator (3) delivers groups of two pulses of opposite polarities.

9. The device as claimed in claim 1, wherein the two scintillator substances (27, 55) constitute a first and a second scintillator layer (SA, SB), between which the photosensitive matrix (1) is situated, in such a manner as to construct a sandwich structure.

10. The device as claimed in claim 1, wherein the incident radiation is X-rays.

11. The device as claimed in claim 9, wherein the photosensitive matrix (1) includes a plurality of photosensitive points (PI to P9) each including a first and a second photosensitive element and a capacitor (DA, DB, CI) connected in series, the two photosensitive elements and the capacitor consisting of layers (30, 31, 32, 34, 40, 41, 42) which are superposed in the direction of a thickness (E) of the matrix included between the two scintillator layers (SA, SB).

12. The device as claimed in claim 11, wherein the matrix (1), in the direction of its thickness (E) is transparent to light which is visible or near visible.

13. The device as claimed in claim 12, which further includes a light source (60) serving to perform a reset to level (RAN) of the photosensitive elements (DA, DB).

14. The device as claimed in claim 13, wherein the light emitted by the light source (60) has a greater wavelength than the light emitted by the scintillator substances (27, 55).

15. The device as claimed in claim 11, wherein the photosensitive elements (D.A, DB) are photodiodes.

16. The device as claimed in claim 11, wherein the photosensitive elements (DA, DB) are phototransistors of the NIPIN or PINIP type.

17. The device as claimed in claim 1, wherein the photosensitive matrix (1) is formed on a substrate (26), and wherein a scintillator layer (SB) is deposited on the substrate (25) and intercalated between the substrate (26) and the photosensitive matrix (1).

18. The device as claimed in claim 17, wherein the substrate (26) is transparent, and wherein the light source (60) is situated on a face of the substrate which is opposite to the photosensitive matrix.

19. The device as claimed in claim 12, wherein the first and second photosensitive elements (DA, DB) have substantially equal thicknesses (E2, E3).

20. The device as claimed in claim 6, wherein the first and second information items (QA, QB) are linked respectively to the two reading charges (Q1, Q2) by the following two relations:

$$Q1 = QA\alpha - QB\frac{CI(1 - \gamma) - CDB\gamma}{CI + CDB} \quad ; \tag{1}$$

$$Q2 = -QB\frac{CDA \cdot CI}{(CI + CDA)(CI + CDB)} \quad ; \tag{2}$$

where QA and QD correspond respectively to the first and the second information items; CI is the capacitor which, in a photosensitive point, is in series with the two photosensitive elements DA and DB; CDA is the equivalent capacitance of the first photosensitive element DA; CDB is the equivalent capacitance of the second photosensitive element DB; $\alpha$ and $\gamma$ are known respectively by the third and fourth relations which follow:

$$\alpha = \frac{\frac{CI \cdot CDB}{CI + CDB}}{\frac{CI \cdot CDB}{CI + CDB}} + CDA \tag{3}$$

$$\gamma = \frac{\frac{CI \cdot CDA}{CI + CDA}}{\frac{CI \cdot CDA}{CI + CDA}} + CDB \tag{4}$$

21. A matrix of photosensitive elements including an array of line conductors (L1 to L3) and an array of column conductors (F1 to F3) and an array of photosensitive points (PI to P9), wherein each photosensitive point (PI to P9) includes, between a line conductor (11) and a column conductor (fl) two photosensitive elements (DA, DB) and a capacitor (CI), the two photosensitive elements (DA, DB) and the capacitor (CI) being connected in series, the two photosensitive elements being connected with directions of conduction which are opposite to one another, in order to constitute two floating-potential points to store separately the charges created by each of the photosensitive elements.

22. The device as claimed in claim 21, wherein for each photosensitive point (P1 to P9) the two photosensitive elements and the capacitor (DA, DB, CI) consist of layers (30, 31, 32, 34, 40, 41, 42) which are all superposed.

23. A matrix of photosensitive elements including an array of line conductors (L1 to L3) and an array of column conductors (F1 to F3) and an array of photosensitive points (P1 to P9), wherein each photosensitive point (P1 to P9) includes, between a line conductor (L1) and a column conductor (F1) two photosensitive elements (DA, DB) and a capacitor (CI), the two photosensitive elements (DA, DB) and the capacitor (CI) being connected in series, the two photosensitive elements being connected with directions of conduction which are opposite to one another, each photosensitive point (PI to P9) includes a first and a second end (10, 11) which are connected respectively to a line conductor (L1 to L3) and to a column conductor (F1 to F3), a first and a second one of floating potential (A, B) where there are stored respectively a first and a second information item (QA, QB) which are produced respectively by the illumination of the first and of the second photosensitive elements (DA, DB), the line conductors (L1 to L3) and the column conductors (F1 to F3) are connected to means (3, G1, G2, G3) for biasing in reverse the photosensitive elements (DA, DB) before their illumination, and then for subsequently forward-biasing them in order to obtain two reading charges (Q1, Q2) associated with the information items (QA, QB) stored in the zones (A, B) of floating potential, and the first and second information items (QA, QB) are linked respectively to the two reading charges (Q1, Q2) by the following two relations:

$$Q1 = QA\alpha - QB\frac{CI(1 - \gamma) - CDB\gamma}{CI + CDB} \quad ; \tag{1}$$

$$Q2 = -QB\frac{CDA \cdot CI}{(CI + CDA)(CI + CDB)} \quad ; \tag{2}$$

where QA and QB correspond respectively to the first and the second information items; CI is the capacitor which, in a photosensitive point, is in series with the two photosensitive elements DA and DB; CDA is the equivalent capacitance of the first photosensitive element DA; CDB is the equivalent capacitance of the second photosensitive element DB; $\alpha$ and $\gamma$ are known respectively by the third and fourth relations which follow:

$$\alpha = \frac{\frac{CI \cdot CDB}{CI + CDB}}{\frac{CI \cdot CDB}{CI + CDB}} + CDA \tag{3}$$

$$\gamma = \frac{\frac{CI \cdot CDA}{CI + CDA}}{\frac{CI \cdot CDA}{CI + CDA}} + CDB \tag{4}$$

24. A device for the conversion of images into electrical signals, including a first and a second scintillator substance (27, 55) which are sensitive to differing energies of an incident radiation and which emit a light which is visible or near visible in response to the incident radiation, which device further includes a matrix of photosensitive elements, said matrix of photosensitive elements including an array of line conductors (L1 to L3) and an array of column conductors (F1 to F3) and an array of photosensitive points (P1 to P9), wherein each photosensitive point (P1 to P9) includes, between a line conductor (L1) and a column conductor (F1) two photosensitive elements LD DB) and a capacitor CCI), the two photosensitive elements (DA, DB) and the capacitor (CI) being connected in series, the photosensitive elements being connected with directions of conduction which are opposite to one another.

* * * * *